UNITED STATES PATENT OFFICE.

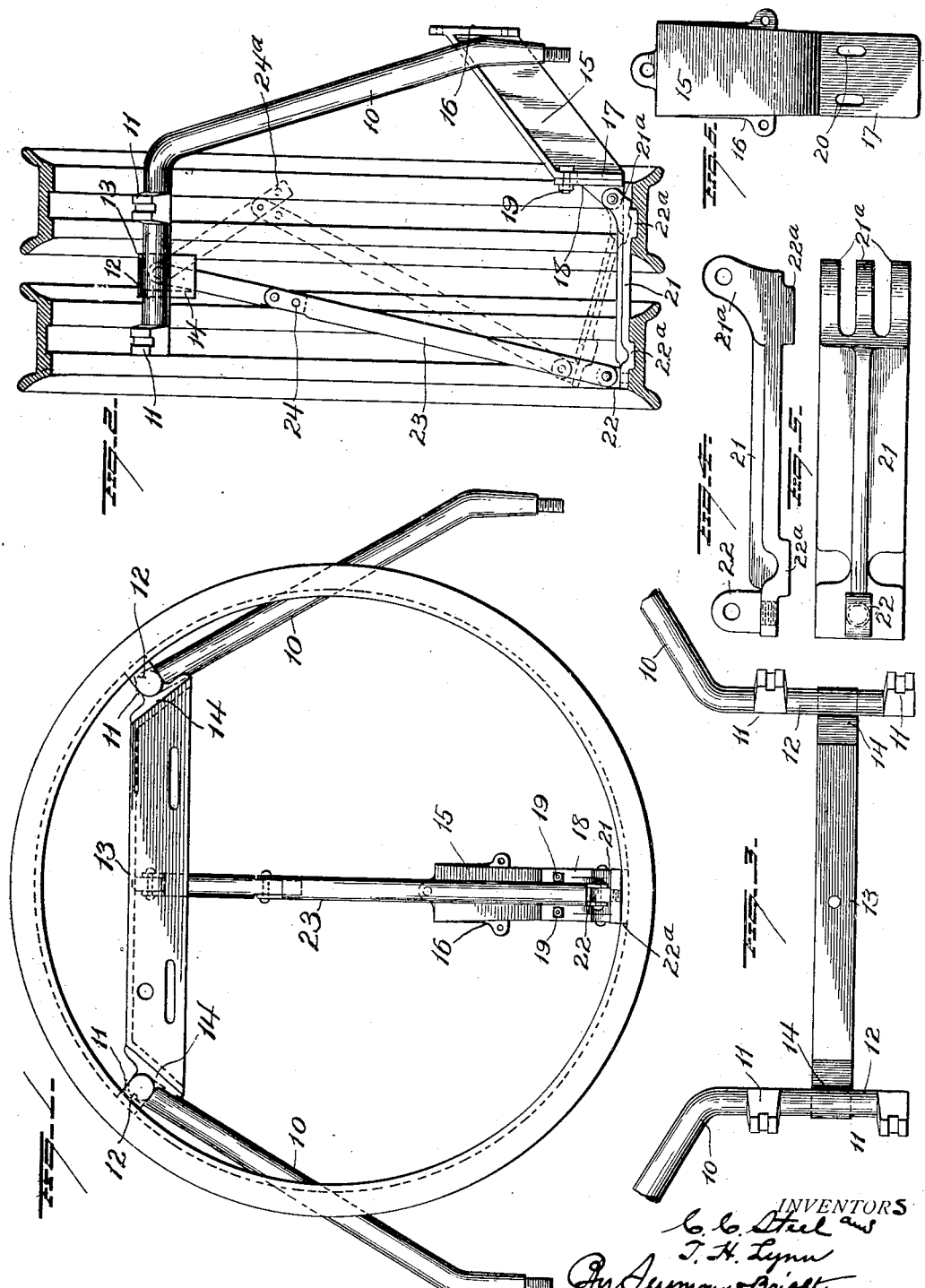

CHARLES C. STEEL AND THOMAS HERBERT LYNN, OF WILLIAMSPORT, PENNSYLVANIA.

SPARE-RIM CARRIER FOR AUTOMOBILES.

1,347,562.     Specification of Letters Patent.     Patented July 27, 1920.

Application filed October 10, 1919. Serial No. 329,838.

*To all whom it may concern:*

Be it known that we, CHARLES C. STEEL and THOMAS H. LYNN, citizens of the United States, and residents of Williamsport, in the county of Lycoming and State of Pennsylvania, have invented certain new and useful Improvements in Spare-Rim Carriers for Automobiles; and we do hereby declare the following to be a full, clear, and exact description of the invention, such as will enable others skilled in the art to which it appertains to make and use the same.

Our invention relates to an improvement in spare rim carrier for automobiles, the object being to provide an improved device adapted to be secured at the rear of an automobile for carrying one or two spare demountable rims or rims and tires, and it consists in the details of construction as will be more fully explained and pointed out in the claims.

In the accompanying drawings, Figure 1 is a view in elevation of our improvement showing a rim in dotted lines thereon; Fig. 2 is a view in side elevation; Fig. 3 is a view in plan, the side standards being broken away; Figs. 4 and 5 are views of the clamping arm and Fig. 6 is a view in elevation of the diagonal support for the lower end of the carrier.

10 represents standards bent as shown in Fig. 2 and threaded at their lower ends for attachment to clips secured to the frame or to a cross bar at the rear. This attachment may be to the frame direct, by means of sockets riveted or bolted thereto, or to a special bar so that it may be attached directly without secondary means.

These standards 10 converge inwardly and are inclined rearwardly, and their free ends 12 are bent rearwardly horizontally to form supports or rests for a rim or rims. The horizontal ends 12 of the supports are connected together and braced by the cross bar 13, preferably made of sheet steel and having beveled ends against which the flat blocks 14 secured to the bent ends of standards bear and to which the said cross bar is secured. The cross bar is L-shape in cross section, one member of which constitutes the top of the bar and the other the rear vertical face thereof, the latter being slotted to receive the number or license plate and a tail lamp.

The horizontal ends 12 of the standards are also provided with wedges 11 adapted to enter the central groove in the inner face of the rim and hold the latter against displacement when the rim is locked to the carrier. Instead of wedges we may use saddles to clasp the side edges of the rim.

In the drawings we have shown the end supports 12 constructed to support two rims, but it is evident that they may be designed for one rim.

15 is a diagonal support secured at its front end 16 to the vehicle and terminating at its rear end in a vertical member having a flat face 17 to which the bracket 18 is secured by the bolts 19, the vertical member of said support having elongated holes 20 therein to permit of the vertical adjustment of the bracket on the support 15. Pivotally secured to the bracket 18 is the tire clamping or locking arm 21, also provided on its outer or lower face with the wedges $22^a$ adapted to engage the seat within the peripheral grooves in the inner faces of the rims. The horizontal members 12 of the standard 10, and the clamping arm 21, form a three point support for the rim, and are located to pass within a standard size rim and support it at the top at two points equal distance from a line passing vertically through the center of the rim, and at its bottom approximately in a vertical plane passing midway between the two upper supports.

The clamping arm, which is shown enlarged and in detail in Figs. 4 and 5, is provided at its front end with an upwardly projecting enlargement $21^a$, slotted to receive the bifurcated ends of the bracket 18 and provided with a hole transversely through the same for the passage of the hinge pin which connects it with the bracket. Its rear end is provided with a threaded hole to receive a clevis 22, and by using clevises of different lengths and adjusting the bracket 18 up or down the carrier can be made to receive rims of various sizes, hence can be adjusted at the start to receive the rims on the car to which it is to be applied, and subsequently changed to carry a different size rim.

23 is a toggle lever, the shorter arm of which is pivoted at its upper end centrally to the underside of the cross bar 13, and its longer arm is pivotally connected at its free end to the clevis 22, the meeting ends of the two levers constituting the toggle overlapping sufficiently for the application of a lock of any kind which is passed through the holes 24 and 24ª which aline when the lever is straight or in its clamping or locking position. The toggle lever 23, extends from the outer or rear end of the clamping arm 21 upwardly and forwardly as shown in Fig. 2, and its joint is broken by a pull on the longer member of the lever toward the rear, hence when the lever is straight, or in locking position, the binding action or tension of the rims clamped by the arm 21 tends to told the lever 23 in its locking position, so that it would be so held even if not locked.

In putting a rim on the carrier the toggle lever is first pulled to position shown in dotted lines Fig. 2, which elevates the clamping arm 21, thus permitting a rim to be placed on the two upper supports and when released, swing to a horizontal position. By now pushing forwardly on the toggle lever, the clamping arm will be forced down into locking contact with the inner face of the rim and lock the latter in place against the possibility of accidental displacement, and by locking the toggle lever, as explained, the rim will be locked against theft. To remove a rim, the toggle lever is pulled rearwardly which raises the clamping arm and thus leaves the rim hanging freely on the two upper supports.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. In a spare rim carrier, the combination of two standards, each having a rim supporting member at its upper end, a cross bar connecting the rim supporting members, a clamping arm located below and in a plane between the two upper supports, a vertically adjustable bracket to which the said arm is pivotally connected, a toggle lever pivotally connected at its upper end to the cross bar intermediate the two upper supports, and means for detachably connecting the lower end of said toggle lever to the rear end of the clamping arm, whereby the latter can be adjusted to carry rims of different diameters.

2. In a spare rim carrier, the combination of two standards adapted to be secured at their lower ends to a vehicle and each having rim engaging means at its upper end, a cross bar connecting said upper ends, a support also secured to the vehicle intermediate the standards, a bracket secured to the rear free end of said support and vertically adjustable thereon, an arm pivoted to said bracket and provided with rim engaging means, and a toggle lever pivoted at one end to the cross bar intermediate the rim engaging means on the latter, and pivoted at its other end to the rear free end of said arm.

3. In a spare rim carrier, the combination of two standards each having a rearwardly projecting upper end forming seats for the rim, a cross bar connecting the said standards at the top, a support located centrally between the standards and projecting rearwardly, a bracket secured to said support and vertically adjustable thereon, an arm pivoted to said bracket and adapted to engage the inner face of the rim at the bottom thereof, a threaded hole in the outer end of said arm, a clevis detachably secured in said threaded hole in the arm and a toggle lever pivoted at its lower end to said clevis and pivotally secured at its upper end to the cross bar.

In testimony whereof we have signed this specification.

CHARLES C. STEEL.
THOMAS HERBERT LYNN.